United States Patent Office 3,728,322
Patented Apr. 17, 1973

3,728,322
LIGHT SENSITIVE ESTERS OF POLYVINYL ALCOHOL
Harlan B. Freyermuth, Easton, and Nathan D. Field, Allentown, Pa., assignors to GAF Corporation, New York, N.Y.
No Drawing. Filed Jan. 14, 1970, Ser. No. 2,941
Int. Cl. C08f 27/12
U.S. Cl. 260—91.3 VA      4 Claims

ABSTRACT OF THE DISCLOSURE

A light sensitive film-forming polymer having the general formula

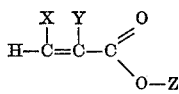

wherein X is selected from the group consisting of halogen, lower alkoxy, phenoxy, heterooxy, C-heterocyclic or polycyclic aryl moieties, Y represents hydrogen, halogen, cycloalkyl or lower alkyl and Z represents the residue of a polyvinyl alcohol which may be partially or completely esterified.

---

The instant invention is directed to novel esters of polyvinyl alcohols. In particular, the instant invention is directed to light sensitive ester derivatives of polyvinyl alcohols which are useful as photoresists. The instant invention is directed to novel compounds having the generic formula

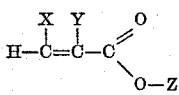

wherein X is selected from the group consisting of halogen, lower alkoxy, phenoxy, heterooxy, C-heterocyclic or polycyclic aryl moieties, Y represents hydrogen, halogen, cycloalkyl or lower alkyl and Z represents the residue of a polyvinyl alcohol which may be partially or completely esterified.

The novel esters of the instant invention may be prepared by esterifying polyvinyl alcohol with an acid halide using as the reaction medium N-methyl-2-pyrrolidone. Preferably, the polyvinyl alcohol is first suspended in the N-methyl-2-pyrrolidone at room temperature and then heated with stirring at an elevated temperature. The elevated temperature could conveniently be that obtained on a steam bath. A more preferred method is to suspend the polyvinyl alcohol in the N-methyl-2-pyrrolidone which has been cooled to about 0–5° C. before the heating is begun. The N-methyl-2-pyrrolidone serves as both a solvent and an acid binding agent.

The polyvinyl alcohol used in the preparation of the ester derivatives may vary in both molecular weight and extent of hydrolysis. Ester derivatives of medium viscosity and highly hydrolyzed polyvinyl alcohol products give very satisfactory photoresist images. The degree of esterification can be varied by varying the proportions of polyvinyl alcohol and acid halide. Further, mixed esters of two acids can also be made using the present invention. Preferably, the polyvinyl alcohol is hydrolyzed in the range of from about 87 to 100%. It is also noted that at least 50% of the polyvinyl alcohol should be esterified and preferably from about 50 to 100% should be esterified.

In connection with the instant invention a variety of acid halides may be employed so as to form the novel compounds disclosed herein. Exemplary acid halides include:

3-(allyloxy)acryloyl chloride
3-butoxyacryloyl chloride
2-cyclohexylacryloyl chloride
3-methoxyacryloyl chloride
3-bromo-2-methylacryloyl chloride
3-chloroacryloyl chloride
2-chloro-3-methoxyacryloyl chloride
2-methoxy-3-phenoxyacryloyl chloride
3-ethoxyacryloyl chloride
3-methoxyacryloyl chloride
2,3-dichloroacryloyl chloride
3-furylacryloyl chloride
3-phenoxyacryloyl chloride
3-naphthylacryloyl chloride
3-anthrylacryloyl chloride It is to be noted that the above compounds are merely exemplary of the acid chlorides useful in connection with the instant invention and that numerous other well known acid chlorides may also be employed in connection therewith.

The instant invention will now be illustrated by the following more detailed examples thereof. It is to be noted, however, that the following examples are not deemed as being limited thereon.

EXAMPLE I

A 250 ml. 3-necked flask equipped with a stirrer, thermometer, condenser and drying tube was charged with 50 ml. N-methyl-2-pyrrolidone and after cooling with an ice bath to 0–5° C., 5.5 g. highly hydrolyzed medium viscosity polyvinyl alcohol was added slowly with stirring during a 5-minute period of time. The mixture was heated with stirring at 90–95° C. on the steam bath overnight. The next morning 50 ml. more N-methyl-2-pyrrolidone was added and the mixture was cooled to 20–25° C. by a cold water bath. By means of a dropping funnel, 15 g. of 3-ethoxyacryloyl chloride, prepared by the reaction of liquid phosgene and ethylvinyl ether according to the process described in Example 1 of USP 2,768,174, was added dropwise during 10 minutes with rapid agitation. The viscosity of the reaction mixture decreased during the addition of the acid chloride. Stirring at 20–25° C. was continued for 45 minutes or until the exothermic reaction had completely subsided. The reaction mixture was drowned in a small stream in 2 liters of water with rapid stirring. The rubbery material was shredded with water in a Waring Blender and filtered on a Buchner funnel. This procedure was repeated three more times.

EXAMPLE II

Five and one-half grams of medium molecular weight, highly hydrolyzed polyvinyl alcohol was gradually added with stirring to 100 ml. N-methyl-2-pyrrolidone which had been cooled to 0–5° C. in a 250 ml. 3-necked flask equipped with a stirrer, condenser, thermometer, dropping funnel and a drying tube. The mixture was allowed to warm to room temperature while stirring, then heated to 90–95° C. with continued stirring on a steam bath overnight. The solution of polyvinyl alcohol was allowed to cool to 50° C. and 11.6 ml. pyridine was added. At 50° C., 16.6 g. (0.125 mole plus 10% excess) of 3-methoxyacryloyl chloride which was prepared by the reaction of liquid phosgene and methylvinyl ether in an autoclave at room temperature, was added dropwise during 15 minutes. The mixture was stirred and allowed to cool to room temperature during a 45 minute period. The reaction mixture was precipitated by pouring gradually with rapid stirring into 3 liters of ice and water. The water was decanted and the rubbery mass was ground in a Waring Blender several times with water and the product was filtered on a Buchner funnel after each operation.

EXAMPLE III

A 500 ml. 3-necked flask with a stirrer, thermometer, condenser, drying tube and dropping funnel was charged with 100 ml. N-methyl-2-pyrrolidone. After cooling to 0–5° C. in an ice bath 11 g. polyvinyl alcohol (medium viscosity—high hydrolysis) was gradually added. The polyvinyl alcohol was dissolved by heating (90–95° C.) on a steam bath overnight. The following morning, 50 ml. more N-methyl-2-pyrrolidone was added. The temperature was adjusted to 50° C.–55° C. and 48 g. 2,3-dichloroacryloyl chloride was added dropwise with stirring during 25 minutes. The reaction mixture was stirred an additional hour to complete the acylation. The reaction mixture was drowned into 2 liters of water with rapid stirring. The precipitated polymer was shredded in a Waring Blender with water and filtered. This procedure was repeated three times.

EXAMPLE IV 5.5 g. polyvinyl alcohol (medium molecular weight; high hydrolysis) was gradually added to 50 ml. N-methyl-2-pyrrolidone at room temperature in a 250 ml. 3-neck flask equipped with a stirrer, thermometer, drying tube and dropping funnel. The mixture was heated overnight on a steam bath at 90–95° C. The next morning 11 ml. pyridine was added and at 50° C. a soluiton of 19.2 g. 3-furylacryloyl chloride dissolved in 50 ml. N-methyl-2-pyrrolidone was added dropwise during 15 minutes. The mixture was stirred for one-half hour at 50° C. and then drowned into 2 liters water with rapid agitation. The granular ester derivative of polyvinyl alcohol was filtered on a Buchner funnel. The product was ground thoroughly with water in a Waring Blender and filtered.

When desired, a less than fully esterified ester of polyvinyl alcohol can be prepared by the regulation of the amount of acid halide employed in connection with the reaction to form said ester. Furthermore, the degree of esterification may also be regulated by de-esterifying a fully esterified polyvinyl alcohol ester after the preparation thereof according to the instant invention.

The novel compounds of the instant invention have been found to be extremely light sensitive and therefore useful as photoresists in the production of printed circuits, integrated circuits, chemical millings, and the like. It is also noted that the novel esters of the instant invention may be sensitized to light with a variety of compounds such as, for example, nitro-anilines as disclosed in U.S. Pat. No. 2,610,120, granted Sept. 9, 1952, and with quinones, benzanthrones and triphenyl methane dyes as disclosed in U.S. Pats. 2,670,286, 2,670,285 and 2,690,966, respectively; and with the ketone compounds of U.S. Pat. 2,670,287.

It is to be noted that when less than full esterification of the polyvinyl alcohol is desired, the degree of esterification may be regulated by controlling the amount of acid chloride employed in the reaction.

What is claimed is:

1. A light sensitive film-forming polymer having recurring structural units which have the general formula

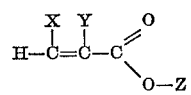

wherein X is selected from the group consisting of chlorine, bromine, lower alkoxy having up to four carbon atoms and phenoxy moieties, Y is selected from the group consisting of hydrogen, chlorine or bromine, cycloalkyl and methyl moieties and Z represents the residue of a polyvinyl alcohol which is selected from the group consisting of partially and completely esterified polyvinyl alcohols.

2. A light sensitive film-forming polymer having recurring structural units which have the general formula:

$$CH_3OCH=CHCOOZ$$

wherein Z represents the residue of a polyvinyl alcohol which is selected from the group consisting of partially and completely esterified polyvinyl alcohols.

3. A light sensitive film-forming polymer having recurring structural units which have the general formula:

$$CH_3CH_2OCH=CHCOOZ$$

wherein Z represents the residue of a polyvinyl alcohol which is selected from the group consisting of partially and completely esterified polyvinyl alcohols.

4. A light sensitive film-forming polymer having recurring structural units which have the general formula:

$$ClCH=CClCOOZ$$

wherein Z represent the residue of a polyvinyl alcohol which is selected from the group consisting of partially and completely esterified polyvinyl alcohols.

References Cited

UNITED STATES PATENTS

| 2,768,174 | 10/1956 | Paul et al. | 260—345.1 |
| 2,332,460 | 10/1943 | Muskat et al. | 260—83 |
| 2,725,372 | 11/1955 | Minser | 260—91.3 |

FOREIGN PATENTS

| 1,013,105 | 12/1965 | Great Britain | 260—91.3 |
| 1,283,673 | 2/1969 | Germany | 260—913 |

OTHER REFERENCES

Journal of Polymer Science: Part A-1, vol. 7, 259–264 (1969).

Nagoyashi Kogyokenkyusho Kenkyuhokou, No. 23,46 (1963), Y. Inukai.

Inukai et al.: Nagoya Municipal Industrial Research Institute. Research Report #29, pp. 47–50.

JOSEPH L. SCHOFER, Primary Examiner

S. M. LEVIN, Assistant Examiner

U.S. Cl. X.R.

260—47 UA; 96—115 P